United States Patent [19]

Wolf

[11] 4,319,390
[45] Mar. 16, 1982

[54] SAG PREVENTION MEANS FOR A ROLLER FOR THE PRESSURE TREATMENT OF WEBS OF MATERIAL

[75] Inventor: Robert Wolf, Herbrechtingen, Fed. Rep. of Germany

[73] Assignee: J. M. Voith GmbH, Fed. Rep. of Germany

[21] Appl. No.: 123,014

[22] Filed: Feb. 20, 1980

[30] Foreign Application Priority Data

Feb. 28, 1979 [DE] Fed. Rep. of Germany ....... 2907761

[51] Int. Cl.$^3$ .............................................. B21B 13/02
[52] U.S. Cl. .............................................. 29/116 AD
[58] Field of Search ................... 29/116 AD, 113 AD

[56] References Cited

U.S. PATENT DOCUMENTS

| | | | |
|---|---|---|---|
| 3,835,690 | 9/1974 | Leonhardt et al. | 403/297 X |
| 4,186,472 | 2/1980 | Biondetti | 29/116 AD |
| 4,228,571 | 10/1980 | Biondetti | 29/116 AD |

FOREIGN PATENT DOCUMENTS 2558068  6/1977  Fed. Rep. of Germany ........ 29/116 AD

*Primary Examiner*—Wayne L. Shedd
*Attorney, Agent, or Firm*—Ostrolenk, Faber, Gerb & Soffen

[57] ABSTRACT

The disclosure concerns a roller for use in pressure treatment of webs of material, or the like. The roller includes an annular roller shell and a beam support extending through the roller shell. The pressure on the roller shell is transmitted through a supporting element to the support within the shell. The supporting element includes a sleeve that is received in a recess in the support. The sleeve is connected with a source of pressurized liquid through a conduit in the support. The sleeve opens toward the shell. A spring normally urges the sleeve toward the shell. The sleeve is closed in the space between the support and the shell except where it opens toward the shell. The inner diameter of the section of the sleeve closer to the shell is approximately the same as the outer diameter of the sleeve more remote from the shell for improving the hydrodynamic force exerted by the "plug" of pressurized liquid inside the shell.

10 Claims, 1 Drawing Figure

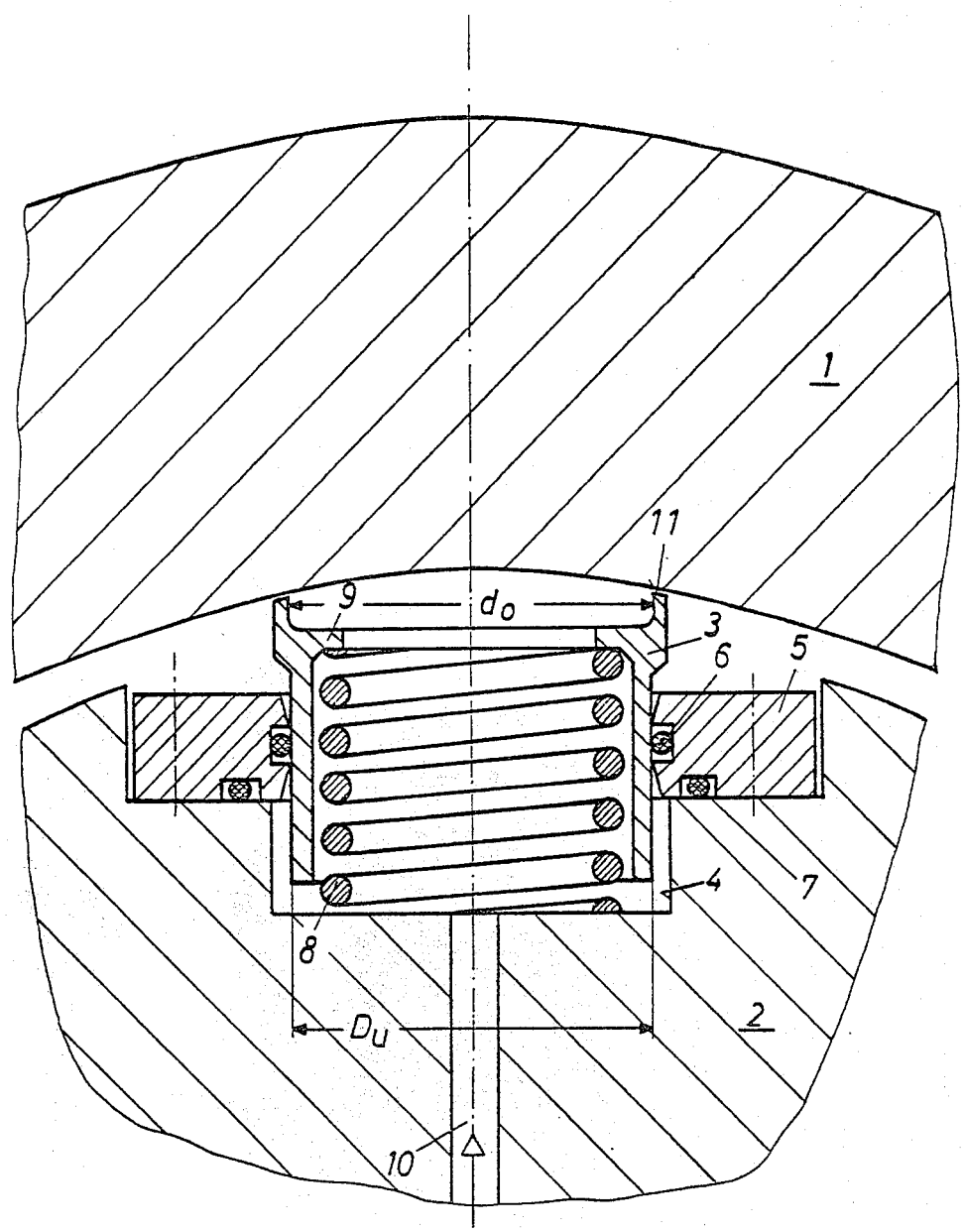

SAG PREVENTION MEANS FOR A ROLLER FOR THE PRESSURE TREATMENT OF WEBS OF MATERIAL

BACKGROUND OF THE INVENTION

The present invention relates to a roller which is suitable for the pressure treatment of webs of material, such as paper, and which has a device for equalizing the sag of the roller over its axial length.

Such a roller generally is used to define a roller press together with at least one counter roller. The roller press has a press nip between the two rollers through which the web of material to be treated is passed. The roller press can be used, e.g., as the dewatering press in a paper making machine or it can form a part of a calender serving for the smoothing of the paper. Numerous other possible uses for such a roller press can be envisioned.

Typically, such a roller comprises an annular, hollow shell or casing. As pressure is applied upon an elongated long roller, it tends to sag. With an annular roller shell, to counter this sag, the roller has a support passing through it. Various devices are known for supporting the shell of the roller against the support inside it to prevent the elongated shell from sagging. Through use of a device for equalizing sag, the pressing forces which act in the press nip may be set to be substantially the same over the entire axial length of the press nip or these pressing forces may be adjusted at different zones along the press nip to different values. The device for equalizing sag can be developed such that the roller shell can, if necessary, be lifted away from the counter roller and then be placed on the counter roller again.

In one roller with sag equalization, shown in U.S. Pat. No. 3,802,044, each of the supporting elements in the roller that serve to transmit pressing forces from the shell of the roller to the support inside the roller is developed as a hydraulic piston. The piston has a smooth surface at its end which rests against the inner surface of the roller shell. The piston is displaceable radially relative to the roller support. The piston together with the support inside the shell encloses a pressure space which is connected to a source of pressurized liquid. Since the roller support inside the shell sags relative to the roller shell upon the operation of the roller, a joint is provided between each piston and the support to allow for the relative motion of the roller support and the piston. In another known roller with sag equalization, shown in U.S. Pat. No. 3,846,883, the piston which is radially displaceable in the support cannot incline along with the support. Instead, a slide shoe is articulatedly connected with the piston between the inner surface of the roller shell and the piston.

In the two above noted roller constructions, measures are taken to reduce the frictional forces between the rotatable roller shell, on the one hand, and the nonrotating pistons or slide shoes, on the other hand. For this purpose, the slide surface of the piston or of the slide shoe, respectively, has hydrostatic pressure fields. These hydrostatic pressure fields are supplied with pressurized liquid by conduits leading from the pressure space present between the respective piston and the common roller support. One disadvantage of known rollers is that the pressurized liquid conduits must have throttling devices with very narrow flow cross-sections. If the pressurized liquid contains small particles of dirt, and this can never be entirely avoided, there is a danger that the throttle points in the liquid conduits will become clogged so that feeding of pressurizing liquid to the hydrostatic pressure fields will be reduced or interrupted. This may result in impermissibly high frictional forces occurring, upon operation of the roller, at the slide surfaces between the roller shell and the pistons or slide shoes. The slide surfaces could even be damaged. Furthermore, much more power would be necessary for driving the roller than when the hydrostatic pressure fields are operating properly. To avoid this problem, FIGS. 2 and 3 of U.S. Pat. No. 4,058,878 show a screen 30 that is provided to prevent clogging of the throttle channels 27.

In the known roller of U.S. Pat. No. 3,846,883, there is the additional disturbing factor that frictional forces also occur upon the relative movements between the slide shoe on the piston and the piston beneath the slide shoe. For this reason, another pressure relief space is provided between the piston and the slide shoe for relieving the pressure in the joint between the piston and the slide shoe. One disadvantage of this embodiment is its high cost.

SUMMARY OF THE INVENTION

The object of the present invention is to provide a roller of the aforementioned type, which reduces the danger of the occurrence of high frictional forces on the slide surfaces between the roller shell and the supporting elements.

In accordance with the invention, the support elements between the roller shell and the common support are not pistons or units comprised of a piston and a slide shoe. Instead, the pressing forces from the roller shell to the support inside the shell are transmitted solely, or almost exclusively, by a "plug" of the pressurized liquid that is customarily employed. Generally, oil is the liquid used for this purpose.

A relatively thin-walled sleeve of preferably circular cross-section is provided at the support in the shell. It does not function as a supporting element for the transmission of the pressing forces, but only serves as a sort of container which surrounds a "plug" of pressurized liquid. The sleeve is placed so that it is substantially at and along the axial line of pressure of the press nip. The sleeve opens out to the shell. The liquid "plug" on the sleeve conducts the pressing forces from the roller shell directly into the support and the "plug" thus serves as a supporting element.

The sleeve around the liquid "plug" essentially only is intended to produce a seal between the roller shell and the support. The sleeve must lie tightly against the inner surface of the roller shell toward which the sleeve opens. Metallic contact between the radially outer edge of the sleeve and the interior of the roller shell occurs only when the roller shell is stationary. As soon as the roller shell rotates, a hydrodynamic lubricating film develops between the sleeve and the shell from the pressurized liquid present. The formation of a lubricating film is more intensive with a higher speed of rotation of the shell. Therefore, no substantial friction forces are anticipated there. In this way, the wear also becomes very slight. Furthermore, the drive power required for rotating the roller remains within reasonable limits.

An improvement is to be expected in this respect as compared with the known rollers described above, since the area of the slide surface on the sleeve in accordance with the invention is substantially less than on the pistons or slide shoes of known rollers.

One advantage of the invention is that pressurized fluid conduits with their throttle points are not used for delivery of pressurizing liquid, since the sleeve of the invention need have only a single large inner pressurized liquid filled space. In this way, there is no danger of contact between the roller shell and the supporting elements in operation, which can occur in the prior art due to clogging of a pressurized liquid conduit. By use of the invention, therefore, the reliability in operation of such rollers is considerably increased.

Furthermore, the manufacture of supporting elements for the roller of the invention is substantially simpler and thus cheaper than in the case of known sag equalizing rollers.

U.S. Pat. No. 3,196,520 shows a roller with sag equalization in which the pressing forces are transmitted from the roller shell directly via pressurized liquid to the roller support. In that case, however, instead of the sleeves according to the invention being provided, an entirely different construction is used. The annular space between the roller shell and the support inside it is subdivided by two sealing strips into two halves, one of which is filled with pressurized liquid. These two sealing strips extend along opposite sides of the support, parallel to the axis of the roller, over the entire axial length of that annular space. One disadvantage of this construction is that the pressure exerted by the pressurized liquid on the shell of the roller is distributed over an extremely large area, namely approximately one-half the inner surface of the roller shell. This leads in operation to a bending of the roller shell. If it is desired to avoid this bending, it is necessary to make the wall thickness of the roller shell substantially greater than the wall thickness of the roller of the invention. Another disadvantage of this known roller is that the part of the annular space which is filled with pressurized liquid forms only a single pressure zone which extends over the entire axial length of the roller. On the other hand, with the roller of the invention, several radially extending sleeves are arrayed axially along the roller, preferably in a row and generally at the pressure line on the roller, and each of the sleeves can be fed different pressures. In this way, the pressing forces which act in the press nip can be adjusted zonewise to different values over the axial length of the roller.

Another roller with sag equalization is shown in U.S. Pat. No. 4,089,094. In that case, a plurality of supporting elements are arranged in a row parallel to the axis of the roller and each is developed in the form of a flat slide shoe, which is pressed by pressurized liquid against the roller shell. Each has a relatively large central opening. As a result, the transmission of the pressing forces from the roller shell to the support takes place in part via the slide shoe and in part directly via the pressurized liquid, which is present in the central opening. One disadvantage of this known roller is that it is not possible for the roller shell to be substantially radially displaced with respect to the roller support. In other words, it is not possible (or at least not to the extent generally necessary) to lift the roller shell from the counter roller. In the case of the roller of the invention, this is readily possible because each sleeve has a shape which extends in the roller shell support direction, i.e. radially of the roller.

As another feature of the invention, the sleeve for containing the liquid "plug" has an inner diameter or cross-sectional area, at the section thereof nearer the roller shell, which is larger than its inner diameter or cross-sectional area away from the shell, and particularly the inner diameter of the sleeve nearer to the roller shell is approximately the same as the outer diameter of the sleeve remote from the shell. As a result, the hydrostatic pressure forces acting on the sleeve in the direction of its radially extending axis counteract each other, at least very substantially and preferably completely. In this way, only a very slight force is transmitted from the roller shell to the support by the structure of the sleeve itself. This transmission of force is effected entirely, or at least practically completely, by the liquid "plug" present in the sleeve.

DESCRIPTION OF A PREFERRED EMBODIMENT

One embodiment of the invention is now explained with reference to the accompanying drawing which shows a partial cross-sectional view through a roller that is provided with sag prevention means according to the invention.

The annular roller shell 1 surrounds and is radially spaced out from a beam-shaped support 2, which extends in known manner axially through the entire shell. In known manner, the ends (not shown) of the support 2 are supported on appropriate beams or bearings (not shown). Between the shell 1 and the support 2, there are a plurality of radially extending sleeves 3 arrayed axially along the beam support 2 at the circumferential location opposed to the other roller (not shown) at the press nip. In other words, each sleeve extends approximately in the direction toward which its support is required. The lower end of each sleeve extends into a respective blind borehole 4 in the support 2. The upper end of that sleeve extends out to the interior of the shell 1. In the support 2, there is recessed a guiding and sealing ring 5 which surrounds the sleeve 3. In appropriate notches in the ring 5, there are O-rings 6 and 7, which rest against the sleeve 3 and the support 2, respectively. The guiding and sealing ring 5 is beveled convexly in shape at its inner circumference so that the sleeve 3 can incline or tilt relative to the support 2 during roller operation while the sleeve 3 remains in contact with the ring 5. As a result, the sleeve 3 sealingly rests against the shell of the roller, even if the support 2 sags.

Inside the sleeve 3, there is a coiled compression spring 8. The spring rests, on the one hand, against the bottom of the blind borehole 4 in the support 2 and, on the other hand, against annular collar 9 spaced slightly radially inwardly from the top of the sleeve 3. The top of the sleeve 3 is otherwise open. Due to the action of the spring 8, the sleeve 3 always lies against the shell 1, even when the roller is stationary and also regardless of whether pressurized oil is being fed to the inside of the sleeve from a pressure source (not shown) through the feed conduit 10 in the support. When the roller shell 1 starts to rotate, there is a slight metal-to-metal rubbing at the slot 11 that is formed between sleeve 3 and shell 1. Pressurized oil from conduit 10 fills sleeve 3 up to the shell 1. A liquid film is immediately established in the region of the slot 11 so that the frictional engagement between sleeve 3 and shell 1 practically disappears.

The length of the sleeve 3 is at least long enough so that it still remains in contact with the guiding and sealing ring 5 even upon maximum sagging of the support 2, i.e. maximum separation of the beam support 2 from the shell 1. In addition, the maximum stroke of the sleeve 3 in the ring 5 can be made sufficient to remove the roller shell 1 if necessary from the counter roller (not shown in the drawing) by a certain distance and then apply it again to the counter roller. This is known from U.S. Pat. No. 3,885,283 for known rollers, described above, whose support elements are force-transmitting piston.

The inside diameter $d_o$ of the sleeve in the section near the interior of the roller shell, above collar 9, is larger than the inner diameter of the sleeve radially inwardly of the collar 9 and particularly is approximately the same diameter as the outside diameter $D_u$ of the sleeve in the region remote from the roller shell 1, radially beneath the collar 9.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A roller for pressure treatment of webs of material, or the like, comprising:

an annular roller shell; a support extending through the shell; the support and the shell being respectively sized so as to have a space defined between them, which enables the support to shift and sag radially with respect to the shell upon pressure being applied to the shell;

at least one support means for transmitting pressing forces from the shell to the support; the support means comprising an opening defined in and extending into the support from the surface thereof for defining an open space for holding a pressurized liquid, the opening extending substantially in the direction of support of the roller shell against pressure applied to the roller shell;

the support means further comprising a sleeve positioned in the opening and the sleeve extending out to and having an end thereof that opens to the shell; the sleeve being shiftable into and out of the opening, to have the end thereof generally at the shell as the support shifts and sags; the sleeve being open inside along its entire length, whereby the sleeve does not throttle liquid flow along its length and the entire opening may be filled with liquid at uniform pressure; the opening being adapted for connection to a source of pressurized liquid; the sleeve being sealed closed across the space between the shell and the support.

2. The roller of claim 1, further comprising means in the support for delivering pressurized liquid to the opening.

3. The roller of claim 1, wherein the sleeve has an axis which extends generally radially of the roller.

4. The roller of claim 1, wherein the sleeve has a first section thereof that is nearer to the shell and has a second section thereof that is more remote from the shell; the sleeve first section having a larger inner diameter than the sleeve second section.

5. The roller of claim 4, wherein the sleeve has an outer diameter; the sleeve first section having an inner diameter which is approximately the same size as the outer diameter of the sleeve at the second section of the sleeve.

6. The roller of either of claims 1 or 5, wherein the sleeve is substantially rigid and nonelastic.

7. The roller of claim 6, wherein the support includes means which enable the sleeve to move with respect to the support and to incline with respect to the support as the shell and support move relatively and as the support sags with respect to the shell.

8. The roller of claim 1, wherein the support includes means which enable the sleeve to move with respect to the support and to incline with respect to the support as the shell and support move relatively and as the support sags with respect to the shell.

9. The roller of claim 1, wherein the sleeve comprises a hollow thin walled generally tubular element.

10. The roller of any of claims 1, 5 or 9 further comprising means for normally continuously biasing the sleeve outwardly toward the shell.

* * * * *